(12) United States Patent
Doran et al.

(10) Patent No.: US 12,505,465 B2
(45) Date of Patent: Dec. 23, 2025

(54) METHOD AND ARTICLE OF MANUFACTURE FOR A FAIR MARKETPLACE FOR TIME-SENSITIVE AND LOCATION-BASED DATA

(71) Applicant: UNL NETWORK B.V., Amsterdam (NL)

(72) Inventors: Jake Doran, Amsterdam (NL); Xander Van Der Heijden, Singapore (SG); Bulent Ozel, Bloemendaal (NL); Emre Turan, Amsterdam (NL)

(73) Assignee: UNL Network B.V., Amsterdam (NL)

( * ) Notice: Subject to any disclaimer, the term of this patent is extended or adjusted under 35 U.S.C. 154(b) by 0 days.

(21) Appl. No.: 17/901,132

(22) Filed: Sep. 1, 2022

(65) Prior Publication Data
US 2024/0078574 A1    Mar. 7, 2024

(51) Int. Cl.
*G06Q 30/0207* (2023.01)
*G06Q 20/36* (2012.01)
*G06Q 30/018* (2023.01)
*G06Q 30/06* (2023.01)

(52) U.S. Cl.
CPC ....... *G06Q 30/0236* (2013.01); *G06Q 20/363* (2013.01); *G06Q 30/018* (2013.01); *G06Q 30/06* (2013.01); *G06Q 2220/12* (2013.01)

(58) Field of Classification Search
CPC ............. G06Q 30/0236; G06Q 20/363; G06Q 30/018; G06Q 30/06; G06Q 2220/12
See application file for complete search history.

(56) References Cited

U.S. PATENT DOCUMENTS

| | | | |
|---|---|---|---|
| 10,572,684 B2 | 2/2020 | LaFever et al. | |
| 10,841,082 B2 | 11/2020 | Ben-Ari | |
| 10,963,513 B2 | 3/2021 | DaCosta et al. | |
| 2018/0216946 A1* | 8/2018 | Gueye | G01C 21/3617 |
| 2019/0043050 A1 | 2/2019 | Smith et al. | |

(Continued)

OTHER PUBLICATIONS

Hu et al. "Analyzing smart contract interactions and contract level state consensus." Concurrency and Computation: Practice and Experience, 32(12): e5228 (Year: 2020).*

*Primary Examiner* — Resha Desai
*Assistant Examiner* — Patrick Kim
(74) *Attorney, Agent, or Firm* — IP AUTHORITY, LLC; Ramraj Soundararajan

(57) ABSTRACT

Disclosed is a system and several associated methods providing a decentralized fair data marketplace wherein said system keeps time-sensitive (real-time) and location-based data. The system includes a decentralized blockchain for recording participants' registrations, storing transactions such as data production, and sell/buy activities, and ensuring authenticity and privacy of transferred data. Data is gathered through crowdsourcing (data pooling) and data generators are rewarded for willingly contributing datapoints using a dynamic pricing engine designed specifically for time-sensitive location-based datapoints. The set of novelties put together in this invention aims at stimulating a fair and participative data economy where individual contributions, valuation and reward sharing processes are conducted transparently, securely and in a tamperproof manner through use of blockchain, leading to an incentivized and quality data curation.

12 Claims, 11 Drawing Sheets

(56) References Cited

U.S. PATENT DOCUMENTS

| | | | |
|---|---|---|---|
| 2019/0156301 A1* | 5/2019 | Bentov | G06Q 20/405 |
| 2019/0349426 A1* | 11/2019 | Smith | H04L 9/3239 |
| 2020/0074484 A1 | 3/2020 | Noyes | |
| 2020/0143352 A1 | 5/2020 | Taylor | |
| 2020/0244463 A1 | 7/2020 | Wilson | |
| 2021/0035669 A1 | 2/2021 | Culver et al. | |
| 2023/0009304 A1* | 1/2023 | Jakobsson | G06Q 30/0241 |

* cited by examiner

METHOD AND ARTICLE OF MANUFACTURE FOR A FAIR MARKETPLACE FOR TIME-SENSITIVE AND LOCATION-BASED DATA

FIELD OF INVENTION

The present invention generally relates to systems and methods for generating, buying, and selling data, more particularly generating a new type of data market where curation is done by data pooling wherein participants are rewarded.

DISCUSSION OF RELATED ART

Any discussion of the prior art throughout the specification should in no way be considered as an admission that such prior art is widely known or forms part of common general knowledge in the field.

In today's digital economy, data is an important resource for businesses and society. Technological developments, such as widespread Internet usage, mobile computing, and the Internet of Things (IoT) lead to a continuous increase in applications that create enormous amounts of valuable data. Data created, collected, or used in individual business processes can be sold to other organizations in the form of raw or processed data, so that it no longer serves as an enabler of products, but is a product itself. This leads to the paradigm that data can be monetized by exchanging and trading between data producers (sellers) and data buyers. Numerous digital platforms in the category of 'data marketplace' or 'data exchange' have emerged in recent years whose primary business model is providing data trading. These platforms are hosted on the public Internet and provide an infrastructure for data exchange by acting as neutral intermediaries that create a secure and trusted linkage between data sellers and data buyers. Registered data sellers can upload and sell static or dynamic data streams, while the data buyer accesses and retrieves these by file downloads, email, or open or proprietary Application Programming Interfaces (APIs). An intuitive electronic storefront, usually a web-based or mobile application, enables all online data transactions, including registration, data posting, and funds transfer. The exchange of data requires fair and competitive pricing and secure payment processing between buyers and sellers on the platform.

Data marketplaces in the prior art typically offer various types of data for different markets and from different sources while offering different pricing and payment strategies using actual or cryptocurrencies. Common types of data sold include business intelligence, advertising, health data, demographic data, map data, personal information, and measurement data. Data types can be mixed and structured in a variety of ways.

When data becomes such an important source of knowledge for businesses, those applications that collect personal, demographic, and behavioral data from individuals (e.g., Facebook, Instagram, WhatsApp, Strava), or obtain web browsing patterns by capturing the IP addresses and cookies during searches or clicks (e.g., Google) can directly sell this valuable data to other businesses (unbeknown to actual datapoint generators) even without resorting to a data marketplace wherein a fair trading and rewarding mechanism for data producers are possible. People should be able to earn fairly when sharing their valuable data; however, it is not currently possible.

Recently, several corporations and open-source consortiums started offering data marketplace services and software components for a variety of data types. Ocean Protocol, Narrative, Snowflake, Streamr, and IOTA are just a few to name. Additionally, articles, patents, and patent applications covering various aspects of distributed data marketplace started emerging. For example, the US. Patent Application No. 2020/143352A1 titled, "System for Providing a Peer-to-Peer Behavioral Data Exchange in a Decentralized Marketplace," filed May 7, 2020, discloses a system for peer-to-peer exchange of data files, wherein a decentralized blockchain is used to capture all sell and buy activities on a ledger. The system provides a graphical user interface for the sellers and buyers to register information including the description of the dataset, a hash value of data for authentication, and data pricing information. The dataset resides in the seller's computing system and directly gets transferred to the buyer's computing system.

US. Patent Application No. 2020/0244634A1 titled 'A Method and System for General Data Protection Compliance via Blockchain' by A. Benavides et. al., filed Jun. 30, 2020, discloses a method to enable privacy control of released data using blockchain. The user's data is encrypted by a key engine. The encrypted (secured) data is stored within a blockchain. When a requester requests the data, the user gives permission to the key engine to release the key so that data is decrypted by the blockchain and delivered to the requester. Although the data is stored by the system of invention and privacy is ensured, in contrast to US 2020/143352A1, it is stored in an encrypted format within the blockchain system, which doesn't scale for large-scale data as blockchain is not designed to store (and distribute to peer nodes) large volumes of data.

US. Patent Application No. 2021/0035669 A1 titled 'System for Providing a Data Market for Health Data and for Proving Rewards for Data Market Participants' for' by K. Culver et. al., filed Feb. 4, 2021, discloses a system and method using blockchain that creates a marketplace for keeping up-to-date healthcare provider directory and health database. Data providers and data validators are rewarded with payment when the database is updated. Each update is recorded on the ledger. The system uses smart contracts defining seller and buyer conditions and validator rewards. U.S. Pat. No. 10,963,513 titled 'Data Method and System' by M. B. DaCosta et. al., obtained Mar. 30, 2021, discloses a method for intelligently indexing static data obtained from published sources over the Internet, storing such indexed data in a graph repository, and making such data available for content sharing platforms.

In stark contrast, this invention relates to methods and a system for providing a special type of data marketplace, the fair data marketplace, wherein individual entities providing data are rewarded through a cooperative data product called 'data pool' that is assembled through crowdsourcing and sold on a marketplace as a new type of data product. The data pool first enables a collection of large volumes of data from individuals (or datapoint generators) on a special topic that is otherwise extremely hard to collect. A side benefit is to create fairness that captures and distributes value to all datapoint generators. This process is particularly helpful for collecting temporal (dynamic) and location-based data that can easily be collected via individual's mobile phones, wearables (micro-devices that are worn as accessories, embedded in clothing, implanted in the user's body), and even fixed-location sensors/Internet of Things (IoT). Traditionally, the actors in the data marketplace are the data seller, the data buyer, and the intermediary. In this invention, the actors also include a large group of datapoint generators (of the order of millions) and data-pool curators. The data curator can be a person, an academic institution, a municipality, a charity, a cooperation, or a government entity that does not seek any profit in collecting data. Alternatively, data curator can be the data seller who seeks profit. The rewarding mechanism intelligently assesses each submitted datapoint and generates the reward incrementally (in the form of micro-payments) spread over time, i.e., using a dynamic and progressive pricing model, powered by an Artificial Intelligence (AI) engine. Although data pooling is a prior art concept, combining data pooling with an AI-based intelligent and incremental rewarding mechanism forms the basis for innovation.

Virtually there is no limit on the kind, format, size, or quantity of data. Even digital photos, videos, audio, text, binary data, and executable scripts could be pushed into the data pool. However, the data type of interest in this invention is not static data collected from Internet sites or from individuals or applications, such as map data or business intelligence. In contrast, the data type of interest is highly temporal (e.g., data collected from a wearable in real-time), or highly temporal and location-based (e.g., a traffic accident on highway 95, or occupancy of a hotel at a particular time). Even intelligent executables generating temporal and location-based data (e.g., a calculator of foot traffic between 7 and 10 pm in an area) are included. The data can be voluminous, dynamic, highly relevant, and possibly applicable for only a short period of time, after which it becomes less relevant or totally irrelevant.

The data pool must incentivize the collection of datapoints that may otherwise be very difficult to source. Each datapoint can be entered into the system manually or automatically through a web browser, a mobile phone, a wearable, a software application, a sensor, or another type of device. Each data pool according to this invention may be different based on its objective, process for the creation of the pool, and reward distribution process, but they also share some common components: (i) a group of people, devices, or applications (together called 'datapoint generators') contribute collectively to data curation; (ii) there is a trusted intermediary that oversees the stages of data pool production; (iii) data recording, validation, cleaning, discovery and rewarding are automated; (iv) a dynamic and progressive pricing engine is used for fairly rewarding and incentivizing datapoint generators, (v) datapoint generators have control data privacy and distribution.

Embodiments of the present invention are an improvement over prior art systems and methods.

SUMMARY OF THE INVENTION

In accordance with the teachings of the present invention, a system and method acting as an intermediary are disclosed for creating a fair data marketplace for time-sensitive and/or location-based data wherein a dataset is generated by crowdsourcing (data pooling) and datapoint generators are dynamically (in increments) rewarded. All buying and selling activities are performed on a peer-to-peer basis.

Each data pool is initiated, activated, organized, and completed through the 'dashboard' application (UI) according to an embodiment of this invention. The data pool is comprised of a plurality of 'datapoints', each datapoint likely being provided by a different 'datapoint generator', wherein these datapoints collectively form the 'dataset' of the pool. The dataset is stored in a central or distributed database of the intermediary, or at the datapoint generator's system. There is no restriction on the type and objective of the data collected in the pool. Typically, there is no restriction as to who can provide a datapoint and how the datapoint is generated. The dashboard is where the data pool is initiated, datapoint schema is shown, the produced final dataset is scrubbed and published, and made discoverable in the marketplace. The dashboard application also enables datapoint uploading.

An object of the present invention is to provide a mechanism to rapidly collect large amounts of valuable data directly and provide a dynamic rewarding model taking account of data entropy. Information/Data Entropy is a proxy measure to determine to what extent the information or data has been diffused or known. The measure is used to mark the degree of distinctiveness in the collected data. The more distinct the information, the higher the reward for information. The reward engine uses an Artificial Intelligence (AI) engine to first sift through large volumes of crowdsourced data to identify those valid datapoints (e.g., based on the location, the timeframe of collection, or data properties) and to eliminate those that do not conform the schema or objective of data collection. While the AI engine runs on the data for clean-up and validation process, the reward engine in parallel computes the probability of appearance of each datapoint to later calculate datapoint entropy.

The system of the invention uses a distributed ledger (such as a blockchain) to record the steps of a two-stage process: (i) each datapoint generator transaction including datapoint submission and datapoint generator rewarding, and (ii) each dataset transaction including initiating the data pool, validating and completing the dataset, and dataset sales. There are numerous benefits of having a blockchain as an intermediary for traceability, anonymity, immutability, and easy revenue distribution, all aspects being well-known in the prior art. One key benefit of blockchain is using a smart contract that is associated with the dataset and even the datapoint. Each smart contract is a computer code stored in a blockchain that can enforce the legal, regulatory, data privacy, and commercial terms at all stages of the process.

In one embodiment, a smart contract implements a dynamic pricing method for rewarding the datapoint generators based on a model using information gathered from the timeliness, accuracy, entropy, and validity of the submitted datapoint.

In another embodiment, another smart contract implements yet another pricing method for rewarding the dataset seller.

In one embodiment, the present invention provides a method of creating, by a dataset curator, a temporal and/or location-based dataset in a blockchain-based data marketplace system, the dataset comprising a plurality of datapoints, each datapoint within the plurality of datapoints received from a datapoint generator using data pooling or crowdsourcing, the method comprising the steps of: (a) registering by the dataset curator in the blockchain-based data marketplace system the dataset comprising a data pool; (b) generating properties of a requested data pool on a user interface (UI) associated with the dataset curator to solicit datapoints, the UI configured to specify at least the following information: a purpose and information content of each datapoint associated with the dataset, a schema of the each datapoint, and a rewarding method associated with each datapoint; (c) configuring a reward calculator according to the rewarding method in (b) and configuring one or more smart contracts for the given datapoint and the dataset according to the information specified via the UI in (b); (d)

generating, by the blockchain-based data marketplace system, a token wallet and a data wallet associated with the dataset curator; and (e) making information associated with the data pool accessible on the public Internet to solicit datapoints to and from the dataset.

In another embodiment, the present invention provides a method for generating a given temporal and/or location-based datapoint by a given datapoint generator for a dataset created by a dataset curator on a blockchain-based data marketplace system, the dataset curator collecting each datapoint for the dataset from a plurality of datapoint generators using data pooling, and giving a reward to each datapoint generator at least in increments, the method having the steps of: (a) submitting by the given datapoint generator the given datapoint by inserting it into a data wallet associated with the given datapoint generator; (b) the blockchain-based data marketplace system checking to determine if the given datapoint is conformant to a predefined schema and contains a valid form of data and, when the given datapoint is conformant, the blockchain-based data marketplace system associating the given datapoint to the dataset according to the steps of: (i) generating a transfer of information on the given datapoint from the data wallet associated with the given datapoint generator to data wallet associated with the dataset curator; (ii) recording the transfer in (i) as a transaction in a blockchain associated with a blockchain-based data marketplace system; (iii) generating a first increment of reward, and transferring reward from a first token wallet associated with the dataset curator to a second token wallet associated with the datapoint generator; and (iv) recording the transfer in (i) and (iii) as transactions on the blockchain.

In yet another embodiment, the present invention provides a system for generating by a dataset curator a temporal and/or location-based dataset in a blockchain-based data marketplace system, the dataset curator requesting each datapoint within the dataset from a plurality of datapoint generators using data pooling or crowdsourcing, and incrementally rewarding each datapoint generator, the dataset being sold by a dataset seller using the blockchain-based data marketplace system, the system comprising: (a) a server application comprising: (1) a dashboard application for registration, and entry of dataset and datapoint information, (2) a platform manager application for managing health of the system, (3) a data pool manager application for creating and managing data pools and creating associated smart contracts, (4) a verification module for verifying datapoints, and (5) a validation module for validating datapoints; (b) one or more databases storing datapoints, datasets, keys, access rights, and policies; (c) a reward calculator application that progressively determines incremental rewards; (d) a plurality of distributed blockchain nodes storing a transaction ledger, smart contracts, token wallets, data wallets, and reward information; and (e) a plurality of client applications for dataset curator, datapoint generator, dataset seller and dataset buyer registration, data management, reward collection, and key management.

In another embodiment, the present invention provides an article of manufacture having non-transitory computer readable storage medium comprising computer readable program code executable by a processor to implement a method of creating, by a dataset curator, a temporal and/or location-based dataset in a blockchain-based data marketplace system, the dataset comprising a plurality of datapoints, each datapoint within the plurality of datapoints received from a datapoint generator using data pooling or crowdsourcing, the non-transitory computer readable storage medium comprising: (a) computer readable program code registering by the dataset curator in the blockchain-based data marketplace system a dataset comprising a data pool; (b) computer readable program code generating properties of a requested data pool on a user interface (UI) associated with the dataset curator to solicit datapoints, the UI configured to specify at least the following information: a purpose and information content of a each datapoint associated with the dataset, a schema of the given datapoint, and a rewarding method associated with the each datapoint; (c) computer readable program code configuring a reward calculator according to the rewarding method in (b) and configuring one or more smart contracts for the given datapoint and the dataset according to the information specified via the UI in (b); (d) computer readable program code generating, by the blockchain-based data marketplace system, a token wallet and a data wallet associated with the dataset curator; and (e) computer readable program code making information associated with the data pool accessible on the public Internet to solicit datapoints to and from the dataset.

BRIEF DESCRIPTION OF DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DESCRIPTION OF THE PREFERRED EMBODIMENTS

Figure 1:
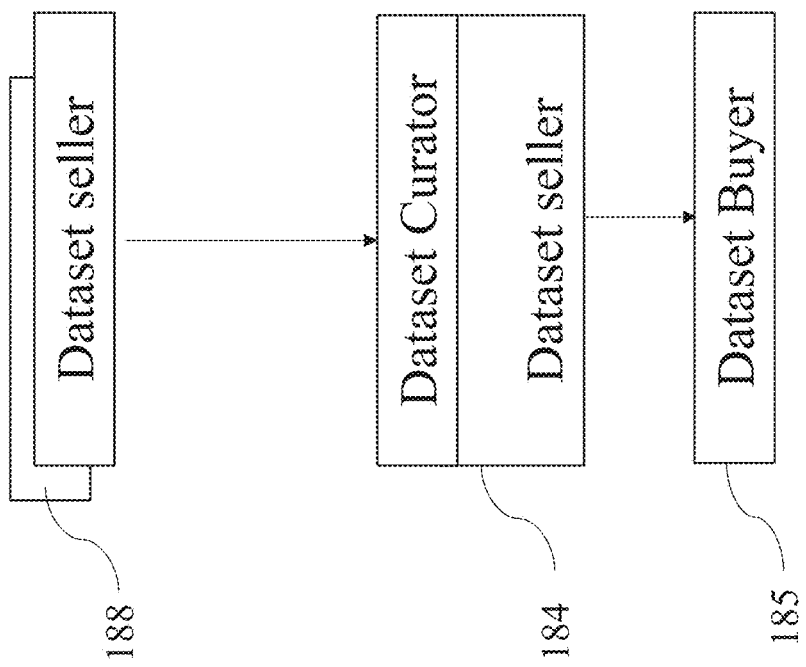
FIG. 1 illustrates a schematic showing actors in data marketplace according to the prior art.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated.

Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

An electronic device stores and transmits (internally and/or with other electronic devices over a network) code (composed of software instructions) and data using machine-readable media, such as non-transitory machine-readable media (e.g., machine-readable storage media such as magnetic disks; optical disks; read-only memory; flash memory devices; phase change memory) and transitory machine-readable transmission media (e.g., electrical, optical, acoustical or other forms of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware. As used herein, the following nomenclature is used:

Datapoint: The piece of data that complies with a specific characteristic, schema, and format. It may be gathered with a single or multiple attributes (e.g., an image with an associated location where the image is taken (attribute 1) and the time when the image is taken (attribute 2).

Dataset: A plurality of datapoints exhibiting the same characteristics. Using the vector geometry representation, one can think of the dataset as a matrix, each datapoint as a row in the matrix, and each attribute of a datapoint as a column.

Datapoint generator: Individual, group of individuals, or an electronic device that generates a datapoint.

Dataset curator: Individual or organization that creates, manages, and integrates the dataset through data pooling and possibly by merging datasets.

Dataset seller: Individual or organization that sets the licensing terms and the price of a dataset and sells it in a data marketplace. The dataset curator may or may not be the seller.

Dataset buyer: Individual or organization that buys a dataset in a data marketplace.

Data Pooling: A process by which datapoints coming from different datapoint generators that has the same characteristics are combined into a dataset.

Datapoint smart contract: A smart contract implemented on blockchain defining the business logic associated with the datapoint. For example, it may enforce licensing terms, validation method and validity period, privacy terms, and rewarding method.

Dataset smart contract: A smart contract implemented on a blockchain defining the business logic associated with the dataset. For example, it may enforce licensing terms, validation method and validity period, and privacy terms.

Commercial smart contract: A smart contract implemented on a blockchain defining the commercial terms for buying and selling the dataset in the marketplace.

Token Wallet: A wallet that has fungible tokens such as reward points, coupons, cryptocurrency, or reward credit. The datapoint generator, dataset curator, seller, and buyer all have token wallets. This wallet is used to transfer (a) rewards from dataset curator to datapoint generator, (b) tokens from dataset buyer to dataset seller, and (c) tokens from dataset seller to dataset curator, Data Wallet: A wallet that has non-fungible tokens representing some information (license, access rights, storage location, etc.) associated with data. The datapoint generator, dataset curator, seller, and buyer all have data wallets. This wallet is used to transfer (a) a datapoint from datapoint generator to dataset curator, (b) a dataset from dataset seller to dataset buyer, and (c) a dataset from dataset curator to dataset seller, The transferor gives rights to the transferee to use (and/or resell) the data associated with said information. The data may physically be stored in a database (or file) wherein its exact location is specified by said information associated with the data.

FIG. 1 illustrates the key actors in the prior art data marketplace. In an example scenario, dataset seller 184 has assumed the role of the dataset curator who gathers datasets from a plurality of dataset sellers 188—either to use a group of datasets to enrich, validate or clean up the dataset. Dataset seller 184 is willing to exchange the dataset with a buyer for (i) a one-time price decided by the seller, (ii) a subscription fee, (iii) a negotiated price, (iv) an automatically generated price, or (v) an auctioned price, all well-known in the prior art. Dataset seller 184 may sell either the raw data or an analysis of the raw data (such as a particular statistical computation result), depending on the data privacy requirements. Dataset seller 184 may sell to one buyer or a plurality of buyers 185 depending on the licensing terms and privacy budget set for the data. The dataset sellers and buyers may be businesses, government institutions, academic institutions, or consumers. They may exchange the data using an intermediary.

Figure 2:
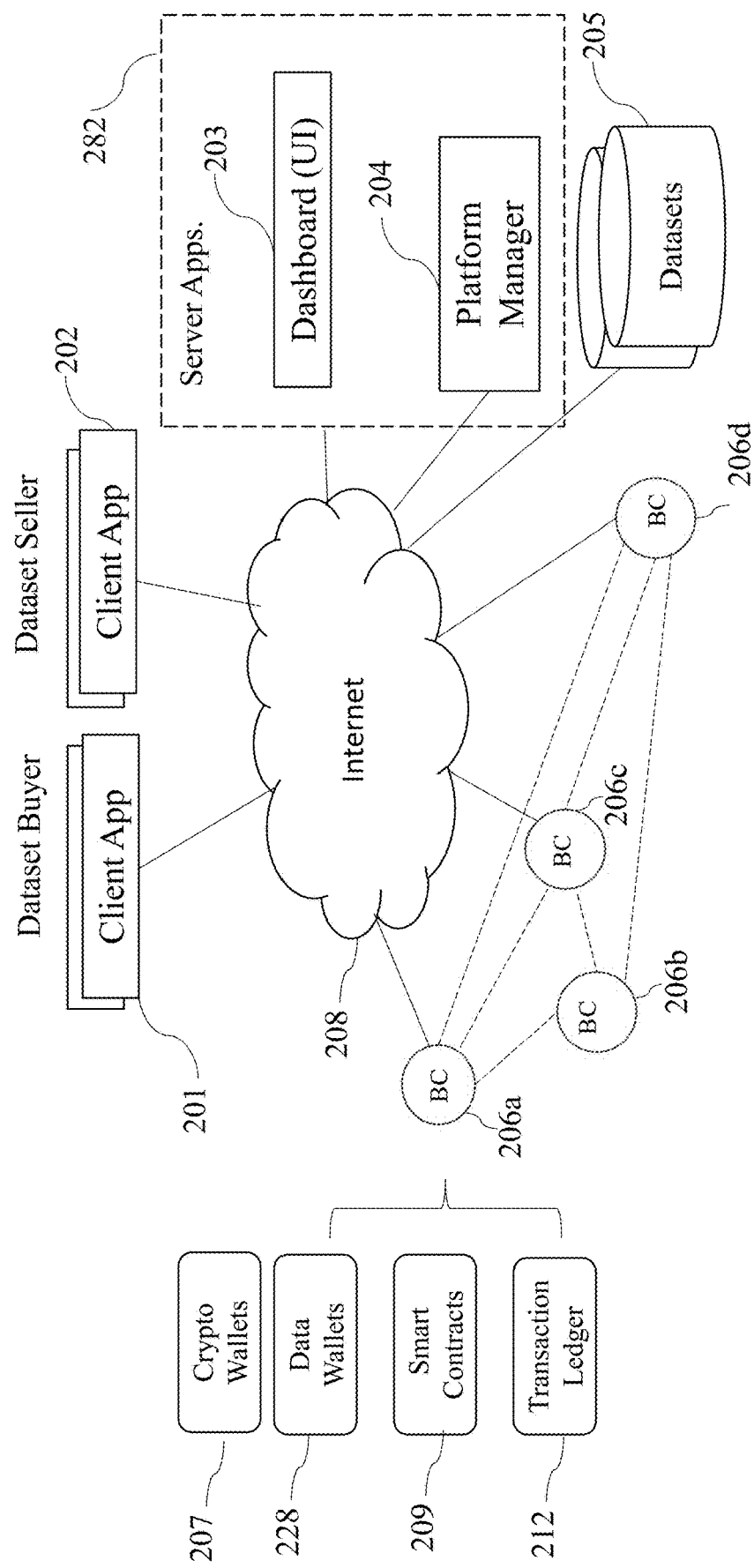
FIG. 2 depicts typical components of a data marketplace according to the prior art.

FIG. 2 illustrates a prior art blockchain-based system used by an intermediary to create a data marketplace to sell and buy datasets. The blockchain infrastructure is comprised of blockchain nodes 206a, 206b, 206c, and 206d distributed across the public Internet 208 that has an identical copy of the blockchain ledger 212. Ledger 212 essentially records all peer-to-peer wallet transactions (e.g., buy, sell, and payment) and smart contracts 209. The ledger 212 is stored as blocks of data. Each block is encrypted by using a cryptographic hash (a special key) generated from the data stored in the previous block, which is in turn encrypted by using a cryptographic hash (key) generated from the data stored in its previous block, and so on. Hash is like a fingerprint of the data. The contents of the block are processed through a cryptographic algorithm (e.g., SHA-256 hashing algorithm), and a unique numerical value—the hash value—is produced that identifies the data. This chain of data blocks becomes immutable because even if a single data field is modified in a block, then all succession of blocks must be modified as the generated hash is dependent on the block's content and uniqueness. All nodes 206a, ..., 206d have an identical copy of the ledger 212. When a new block is generated, it must be propagated to all other nodes of the blockchain.

Client applications 201 and 202 may be a web browser, a mobile application, or a downloadable application. The dataset buyer or seller can reach the system of the intermediary through the Internet 208. Server application 282 has a dashboard 203 (a storefront) for data sellers to simply display information on their dataset and data buyers to view and initiate a purchase. The purchase process is peer-to-peer. Platform manager 204 is a general application for the configuration of the platform as well as crafting the smart contract applicable to the dataset by using choices made by the data seller. Datasets Database 205 is a cloud-based storage or a storage owned by the intermediary, or storage at the site of the dataset seller. If the transactions are performed based on cryptocurrency, the nodes keep each actor's token wallet 207 that contains the number of crypto coins. Furthermore, data wallets 228 are configured to keep the information on each dataset asset as a non-fungible token.

Figure 3:
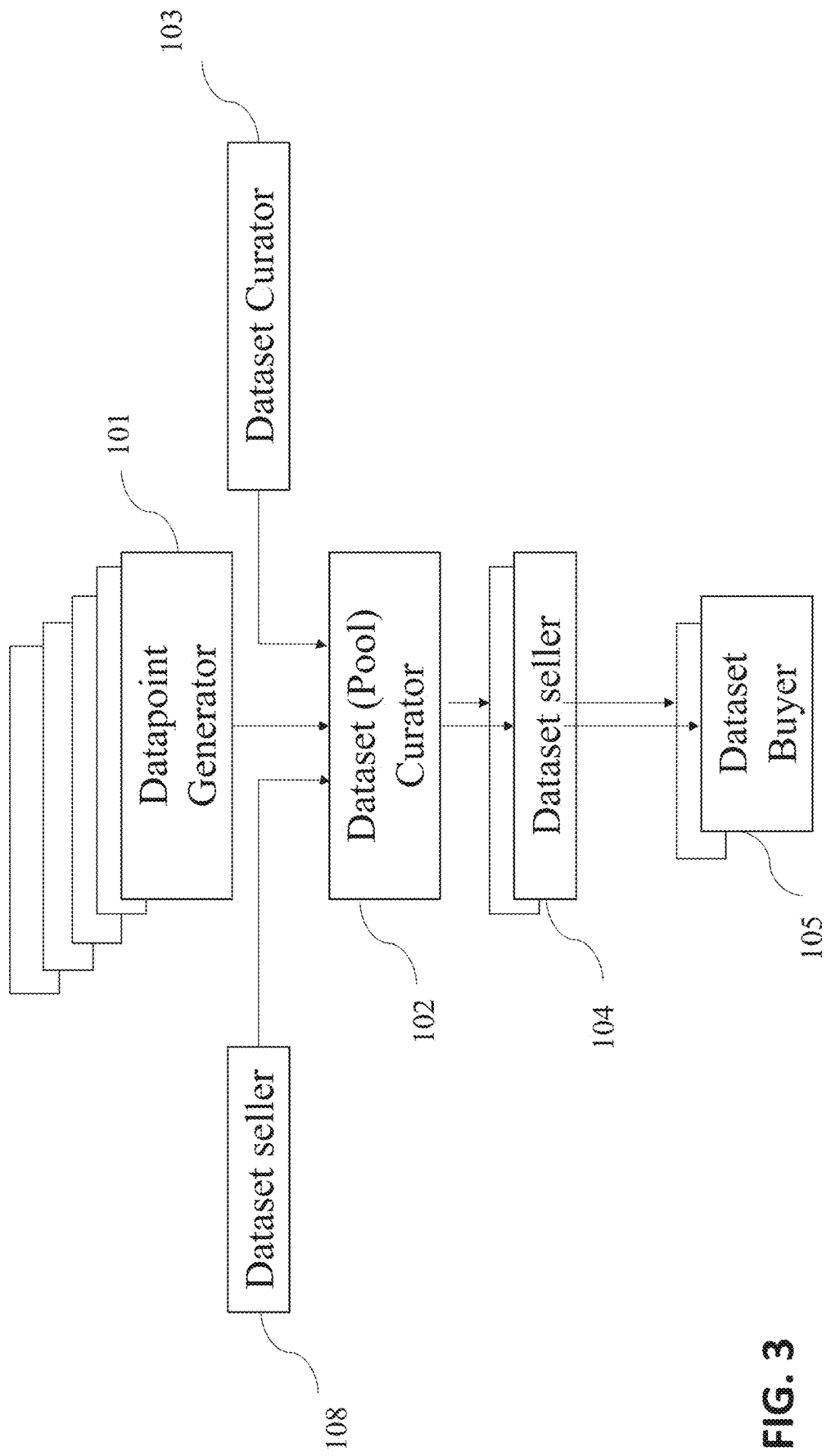
FIG. 3 illustrates a schematic showing actors in a fair data marketplace according to the present invention.

FIG. 3 illustrates the key actors in an example embodiment of this invention. Dataset curator 102 gathers the data from a plurality of datapoint generators 101 by first creating a data pool to perform crowdsourcing. Dataset curator 102 may also gather data from dataset seller 108 and dataset curator 103 (who may not be a seller) to either use these datasets to enrich or validate some or all the data in the data pool. Dataset curator may also generate a 'data portfolio' by combining data from a plurality of datasets some or all of which may be generated through data pooling while others may not. Dataset seller 104 is willing to exchange the dataset with a buyer for a one-time price decided by the seller, a subscription fee, a negotiated price, or an auctioned price. The dataset curator may or may not be the dataset seller. There may be a plurality of dataset sellers for a dataset generated using data pooling by a dataset curator. Dataset seller 104 sells either raw data or statistical analysis of the raw data, depending on the data privacy requirements. Dataset seller 104 may sell to one buyer or a plurality of buyers 105 depending on the licensing terms. They exchange the data peer-to-peer using a trusted intermediary. The dataset curator and seller can be the same entity taking the roles of (i) collecting datapoints by data pooling and constructing the dataset (curation), and (ii) exchanging the dataset for money (selling).

A key aspect of this invention is an incremental (dynamic) and progressive rewarding mechanism established for the datapoint generators. The reward increment indicates a step, or progression, on collecting and processing the data. The reward increments (micro-rewards) occur, for example, (i) at the time of datapoint submission, and/or (ii) at the time of datapoint validation, and/or (ii) at the time of dataset completion, and/or (iii) at the time of each dataset sales. As time progresses, more information becomes available about the quality and importance of a submitted datapoint. Depending on the implementation, some datapoint generators may not receive all the above reward increments while others do. The data curator may reward the datapoint generators using different rewarding strategies such as points, reward credits, cryptocurrency, or cash.

Figure 4:
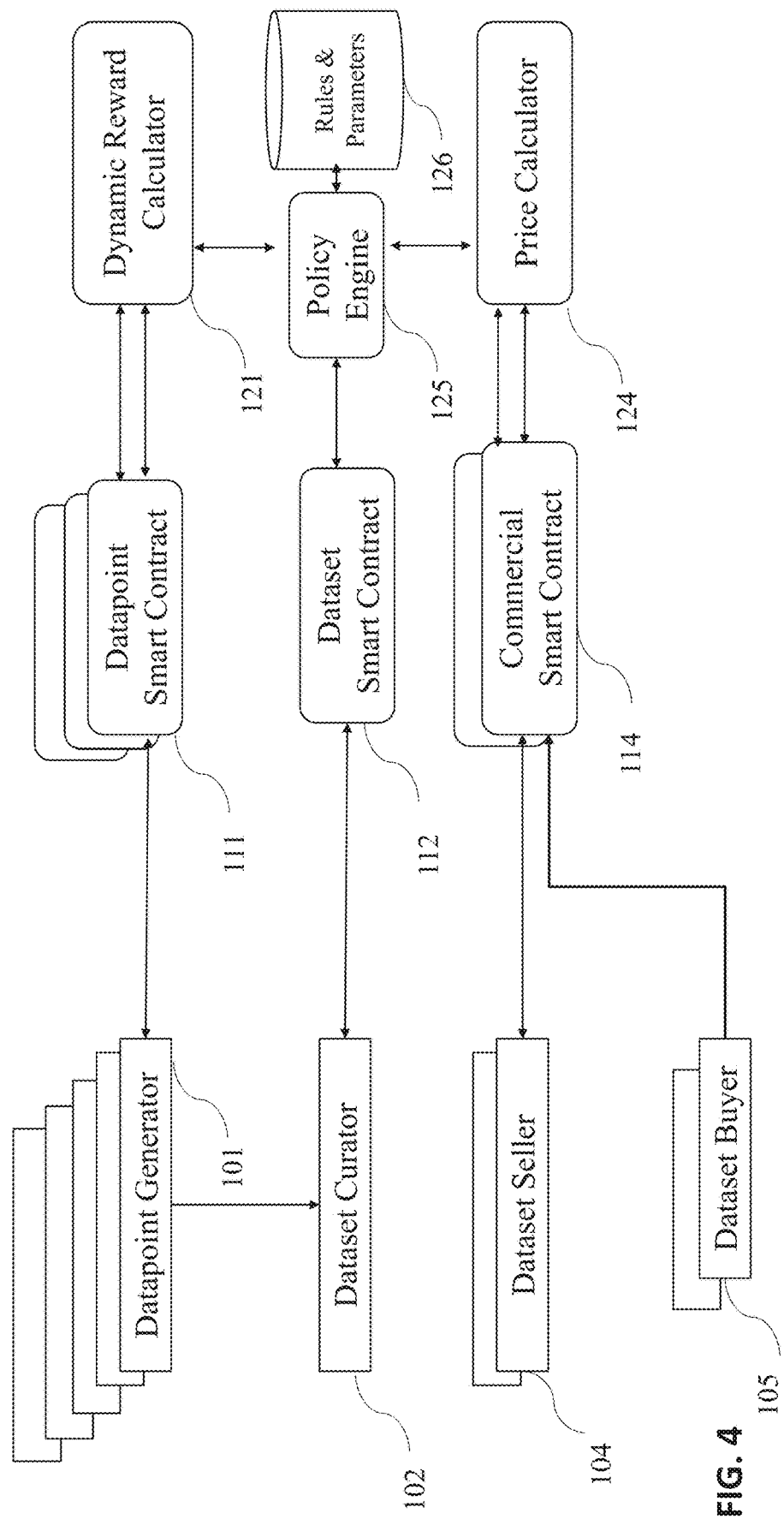
FIG. 4 illustrates fair data marketplace actors and associated smart contracts according to the present invention.

FIG. 4 illustrates each key actor and the associated smart contract. Datapoint smart contract 111 applies to datapoint generator 101. Dataset smart contract 112 applies to dataset curator 102. Commercial smart contract 114 applies to dataset seller 104. The smart contracts shown in this figure are merely for the purposes of explaining the hierarchical operations of the platform when data pooling is used. There may be other smart contracts used in the platform not shown here. Furthermore, each smart contract may have more (or less) information.

Datapoint smart contract 111 is applicable to the datapoint generator at the top tier of the hierarchy. It is a computer code that forms and keeps track of the token wallet (contains fungible tokens in the form of a reward) and data wallet (contains a non-fungible token per datapoint certifying it as a digital asset). Ownership of datapoint is often associated with a license to use that also defines the access rights and privacy terms. The smart contract executes dynamic reward calculator 121, a computer code and an embodiment of this invention, upon completion of each stage of dataset construction and sales, and computes incremental rewards according to an embodiment of the present invention. The rules and parameters used by calculator 121 are extracted from database 126. General policy rules used in smart contract 111 are enforced through policy engine 125 wherein its parameters are configurable and stored in database 126.

Dataset smart contract 112 is applicable to dataset curator 102 at the second tier of the hierarchy. It is a computer code that forms and keeps track of the token wallet and data wallet (contains a non-fungible token per dataset certifying it as a digital asset) for the dataset curator, defines the access rights, and describes the financial transactions (e.g., fees to be paid to intermediary for the usage of the platform as well as for each transaction processing on blockchain, reward to be paid to datapoint generators, etc.). General policy rules for facilitating, enforcing, and verifying transactions are obtained from the policy engine 125 wherein the corresponding parameters are configurable and stored in database 126.

Commercial smart contract 114 is applicable to dataset seller 104 at the third tier of the hierarchy. It is a computer code that forms and keeps track of the token wallet and data wallet and defines at least the commercial aspects of data exchange. General policy rules for facilitating, enforcing, and verifying transactions are obtained from the policy engine 125 wherein the corresponding parameters are configurable and stored in database 126. Commercial smart contract uses price calculator 124 for price determination. The dataset seller may obtain the dataset by data pooling only, or by combining a plurality of datasets (some or all of which may be pooled data) using so-called data portfolio generation process according to an aspect of this invention.

Figure 5:
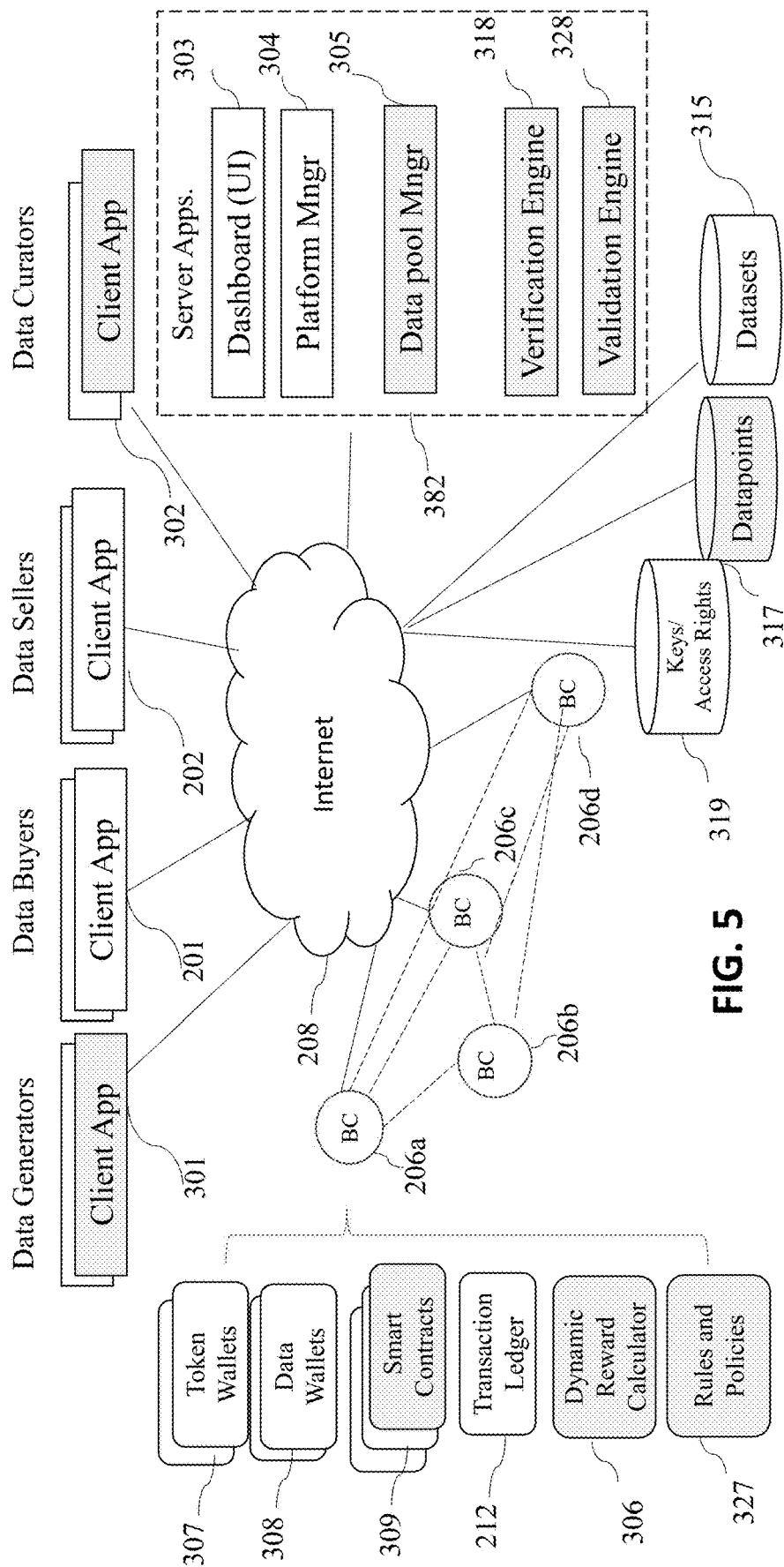
FIG. 5 depicts a high-level diagram of components of the system according to the present invention.

FIG. 5 illustrates a high-level block diagram of an embodiment of the system. Compared to a similar system in the prior art (note elements Internet 208 and ledger 212 are similar in functionality to what is shown and described with respect to FIG. 2), additional software components are provided to support data pooling along with a dynamic rewarding mechanism. New client user interfaces 301 and 302 are provided for the new actors, namely the datapoint generator and the dataset curator. Additional smart contracts 309 are included as described in FIG. 4. Server application 382 has dashboard 303 and platform manager 304, as in prior art. Data pool manager 305 is a computer code that handles all processes associated with a dataset that uses data pooling including (i) generating and running smart contracts, (ii) generating and managing contents of token wallets 307 and data wallets 308, and (iii) managing the lifecycle of the pool. Dynamic reward calculator 306 is a computer code used to compute incremental rewards for datapoint generators using rules/policy engine 327. Verification Engine 318 is a computer code to verify the datapoints. Verification Engine 318 may be a local intelligent application such as an Artificial Intelligence (AI) engine trained on the specific data type aided by a human expert during datapoint collection process. Alternatively, it is an AI engine readily trained, or a remote trained AI engine that is used by connecting to an external platform (e.g., using another application provider). Verification Engine 318 may also be a simple local or remote application that performs verification algorithmically, or numerically, e.g., based on threshold checks. A simple verification example for a datapoint that contains an image is to check if the image contains the desired object. Another simple verification example for a datapoint that contains a numerical value is to check if it is within reasonable upper and lower limits. Validation Engine 328 performs intelligent datapoint validation by comparing the contents of different datapoints in the same dataset or against datapoints in other datasets. A simple validation example for a datapoint that contains an address is to check if the address is an existing valid postal address. Another simple validation example for temporal data is to check if a second datapoint generator enters the same datapoint (e.g., an important shot of the same traffic accident), in which case the first datapoint is called 'validated'. Validation Engine 328 aids the dynamic reward calculator by providing a validation stamp on datapoints.

Reward calculation considers the timeliness of the datapoints as well as the validity of temporal data. For example, those datapoints that are provided earliest and validated by datapoints received later will receive a bigger reward. The reward potential will fade as time progresses if the same data is already received numerous times. Validation Engine 328 also computes the probability of appearance of each datapoint in the dataset after the dataset is completed. This probability is used to determine the distinctness (or uniqueness) of the datapoints in the rewarding process. Another example of the role of Validation Engine 328 as an aid to reward calculation is the 'Citizen Sensing Project' well-known in the prior art, wherein, say, the data pool are pictures of trees in a specific neighborhood. According to the dataset smart contracts 309 at least twenty distinct tree images must be submitted for the rewards to kick-in for datapoint generators. The validation engine checks to determine if twenty distinct trees are captured by the dataset by comparing different datapoint images. Verification Engine 318 is used to identify the tree images using, for example, the aforementioned AI engine to aid validation. If so, it informs the reward calculator to divide the allocated data pool reward among all contributors. Otherwise, no rewards are issued to contributors.

Datapoints are stored in database 317 in the cloud or on a platform's storage such as the InterPlanetary File System (IPFS) that creates a peer-to-peer network for storing and sharing data in a distributed file system. IPFS uses content-addressing to uniquely identify each file in a global namespace. It is suitable for use in conjunction with blockchain to store large amounts of data. The content addresses of datapoints 317 and datasets 315 are stored in respective data wallets that aid in finding the location of the corresponding data within the storage. Keys and access rights are stored in database 319.

Figure 6:
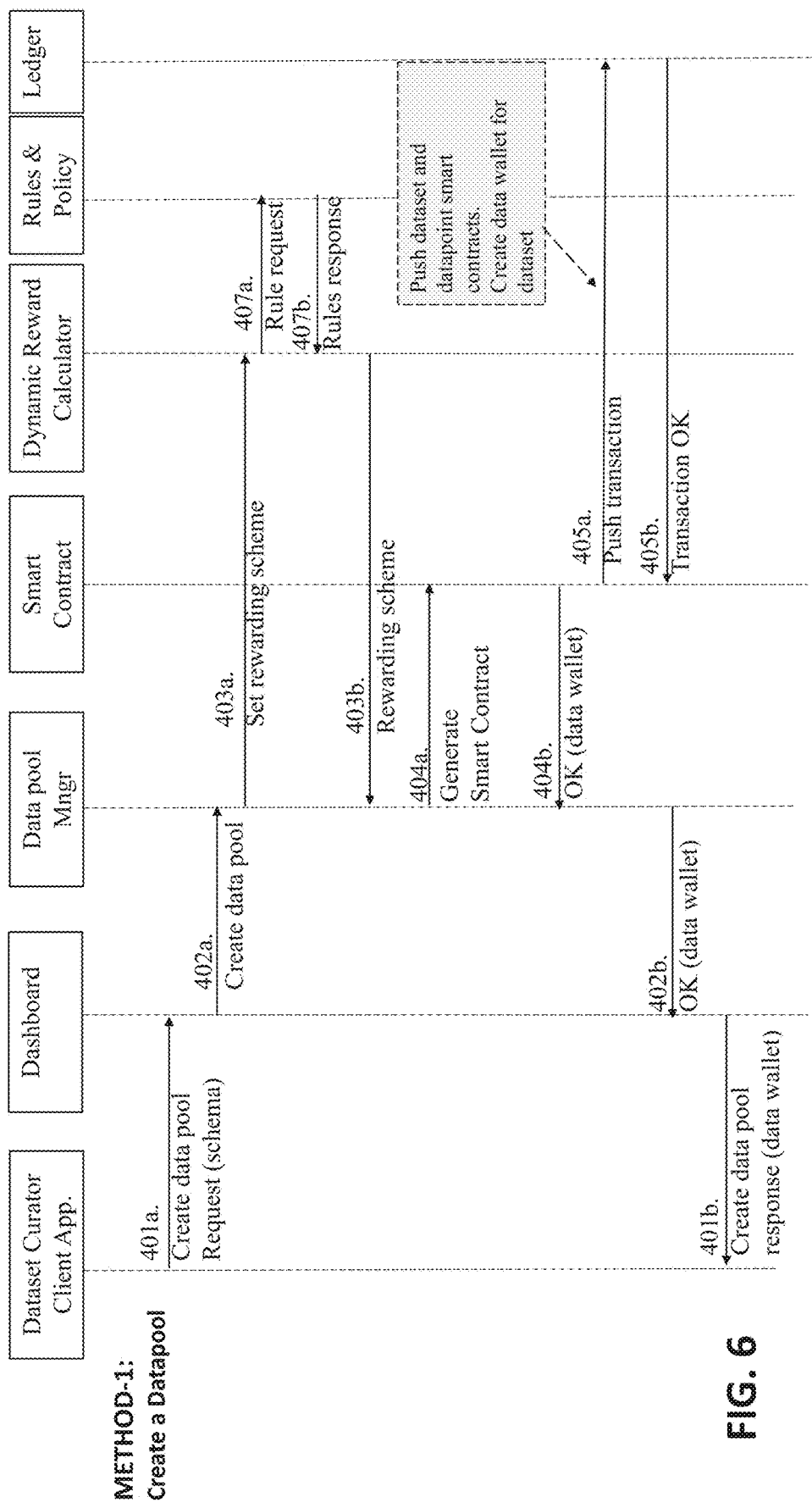
FIG. 6 illustrates a message diagram showing a first method of the present invention.

FIG. 6 illustrates the first method of the invention, namely, the creation of a data pool. Dataset curator client application 301 generates the information associated with the data pool including the datapoint schema (all attributes and each attribute's format), the datapoint generator rewarding scheme, the rules and policies, and using dashboard UI 303, sends a request to the intermediary to create the data pool template in step 401a. In step 402a, the dashboard 303 sends this request to data pool manager 305. In step 403a, the data pool manager collaborates with dynamic reward calculator 306, which in turn gathers information from rules/policy 307, to configure calculator 306 according to chosen reward parameters in steps 407a and 407b. In step 404a, data pool manager generates the computer code corresponding to both datapoint smart contract 111 and dataset smart contract 112 using smart contract templates or smart contract API and stores the new contracts on blockchain. Accordingly, smart contract 112 configures the data wallet for the dataset in step 404b (we assume that the dataset curator has registered to the system through a previous process not shown here, and has a token wallet). Once the smart contracts and data wallet are generated, these two transactions are pushed into the ledger according to step 405a and 405b. Note that the dataset curator may have a single token wallet, but a plurality of dataset wallets if he/she is engaged in creating a plurality of different datasets. Alternatively, the dataset curator may have a pair of distinct token and data wallets per dataset. In turn, in step 402b, the data pool manager 305 makes information available on the dashboard for the newly formed data pool. Client application 301 generates security keys (e.g., public and private key pairs) for the dataset curator and stores the private key on the client application while sharing the public key on the dashboard. Datapoint generator may encrypt the datapoint with the dataset curator's public key before sending it to the dashboard. Dataset curator then decrypts the datapoint by using said private key. In step 401b, dashboard 303 returns the data wallet created by the system to the dataset curator.

Figure 7:
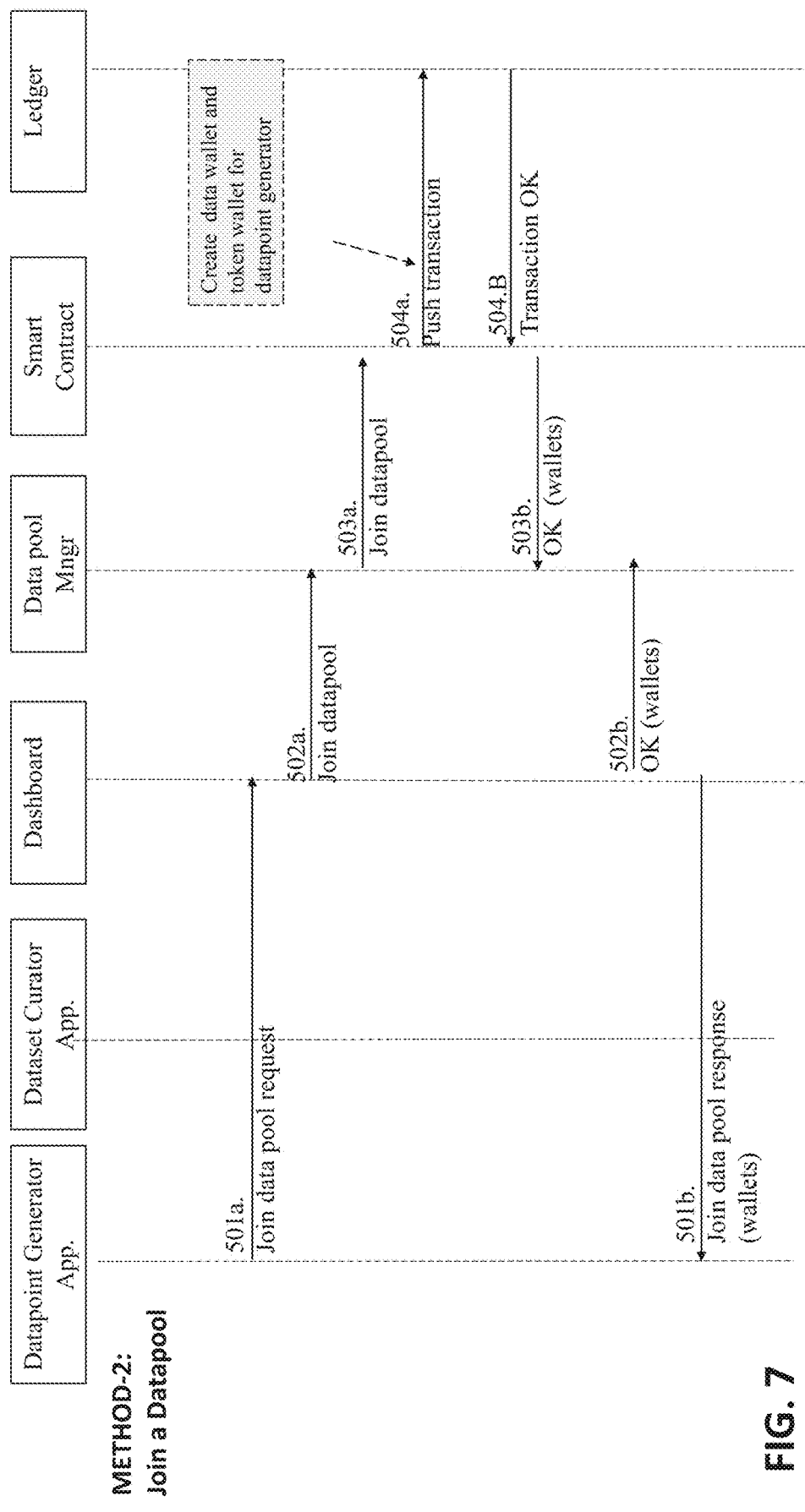
FIG. 7 illustrates a message diagram showing a second method of the present invention.

FIG. 7 illustrates the second method of the invention, namely, a datapoint generator joining an existing data pool that is created according to the first method. Datapoint generator client application sends a join request to dashboard UI 303 in step 501a. In step 502a, the dashboard forwards the request to the data pool manager. In step 503a, data pool manager runs the datapoint smart contract. The smart contract generates the wallets. The transaction is queued for processing in blockchain in step 504a. The transaction is validated in step 504b and inserted into a block, i.e., datapoint's token and data wallets are recorded into the ledger. Steps 503b, 502b, and 501b return an OK to datapoint generator's client application.

Figure 8:
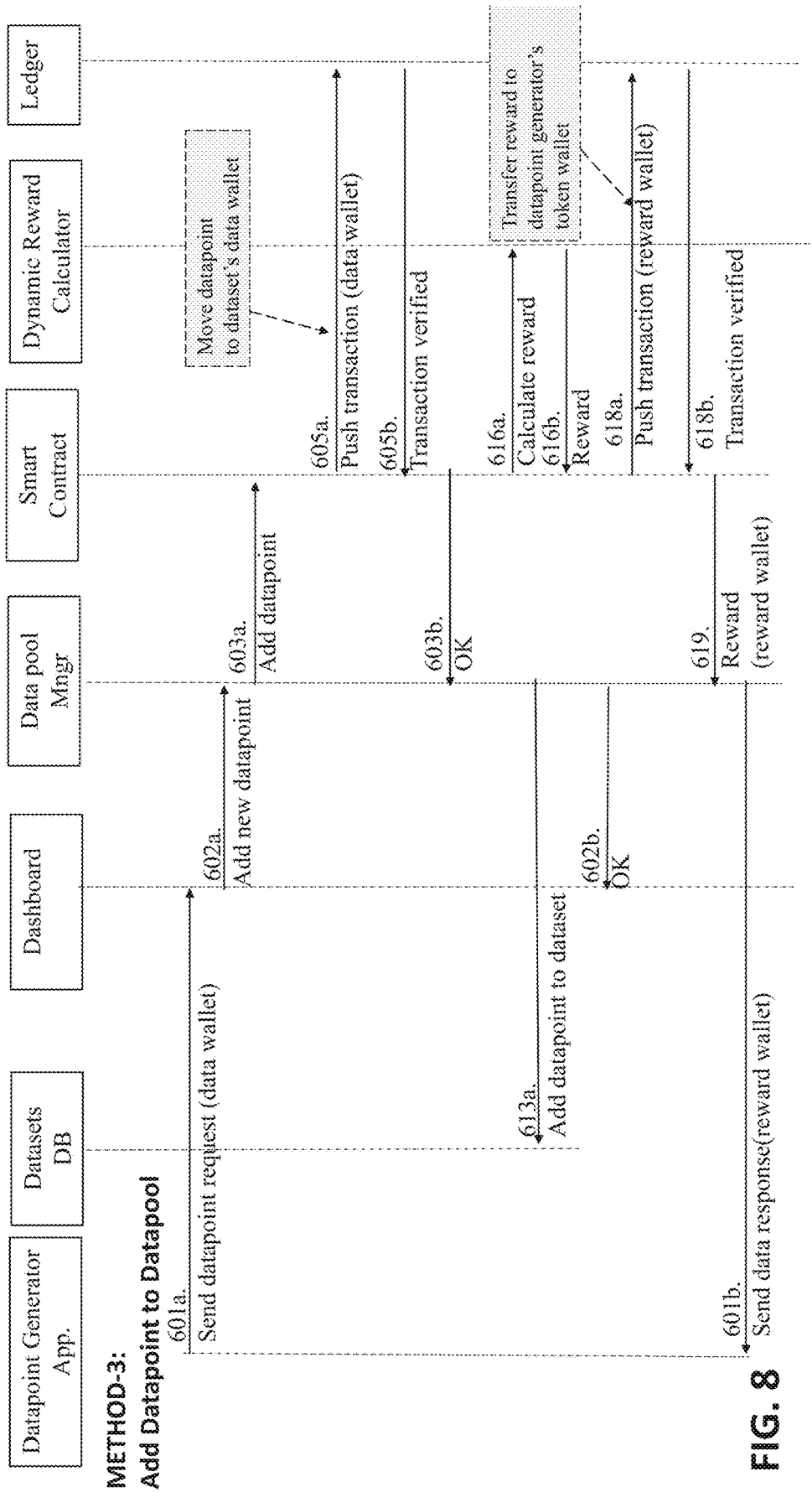
FIG. 8 illustrates a message diagram showing a third method of the present invention.

FIG. 8 illustrates the third method of the invention, namely, a datapoint generator adding a datapoint to the data pool. Datapoint generator client application encrypts the datapoint using the dataset curator's public key and sends it to dashboard UI 303 in step 601a. In step 602a, the dashboard forwards the request to the data pool manager. In step 603a, data pool manager runs the datapoint smart contract. This smart contract transaction of adding the datapoint to the dataset (information associated with the datapoint is added to the data wallets of datapoint and dataset) is queued for processing in blockchain in step 605a. The transaction is validated in step 605b and inserted into a block, i.e., recorded into the ledger. The data wallet corresponding to the datapoint is updated. Step 603b returns an OK to the data pool manager. In turn, the data pool manager returns an OK to dashboard in step 602b. In step 613, the datapoint is appended into the dataset DB. The dataset data wallet now has the content reference. In steps 616a and 616b, the smart contract runs the dynamic reward calculator and determines the first incremental reward amount and adds the amount to the datapoint's token wallet, and deletes the amount from the dataset's token (reward) wallet. The reward is pushed by the smart contract to the data pool manager in step 619 after it is recorded into the ledger according to steps 618a and 618b, and made visible to the datapoint generator client app in step 601b.

Figure 9:
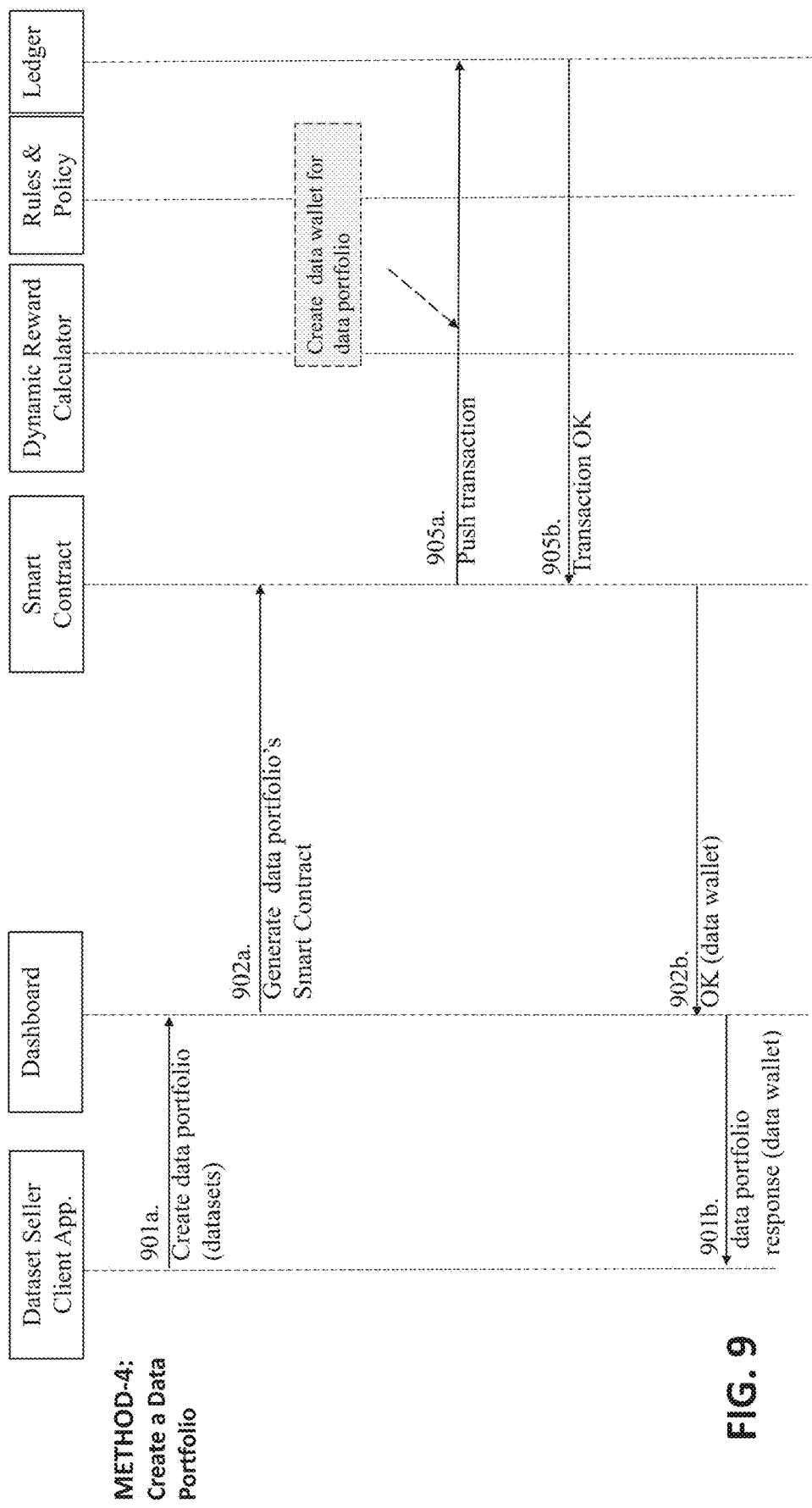
FIG. 9 illustrates a message diagram showing a fourth method of the present invention.

FIG. 9 illustrates the fourth method of the invention, namely the process of creating a data portfolio by a dataset seller (or curator). A data portfolio is a combination of a plurality of datasets that may be previously generated by data pooling, or not. In step 901a, dataset seller generates the data portfolio by combining the datasets in his/her possession using dashboard user interface 303. Said combining may involve taking a subset of information from one dataset and other subsets of information from other datasets to generate a new dataset. Alternatively, said combining may involve taking a full set of information from one dataset, and subsets (or full sets) of information from other datasets to generate a new dataset. In step 902a, a corresponding smart contract is generated. The smart contract generates a data wallet corresponding to the combined datasets, and in steps 905a and 905b, the smart contract and the data wallet are recorded on the ledger. In steps 902b and 901b, the dashboard UI and the data seller's client applications are informed, respectively, of the completion of data portfolio creation, upon which the information associated with said data portfolio becomes visible on dashboard UI 303 to all potential buyers.

Figure 10:
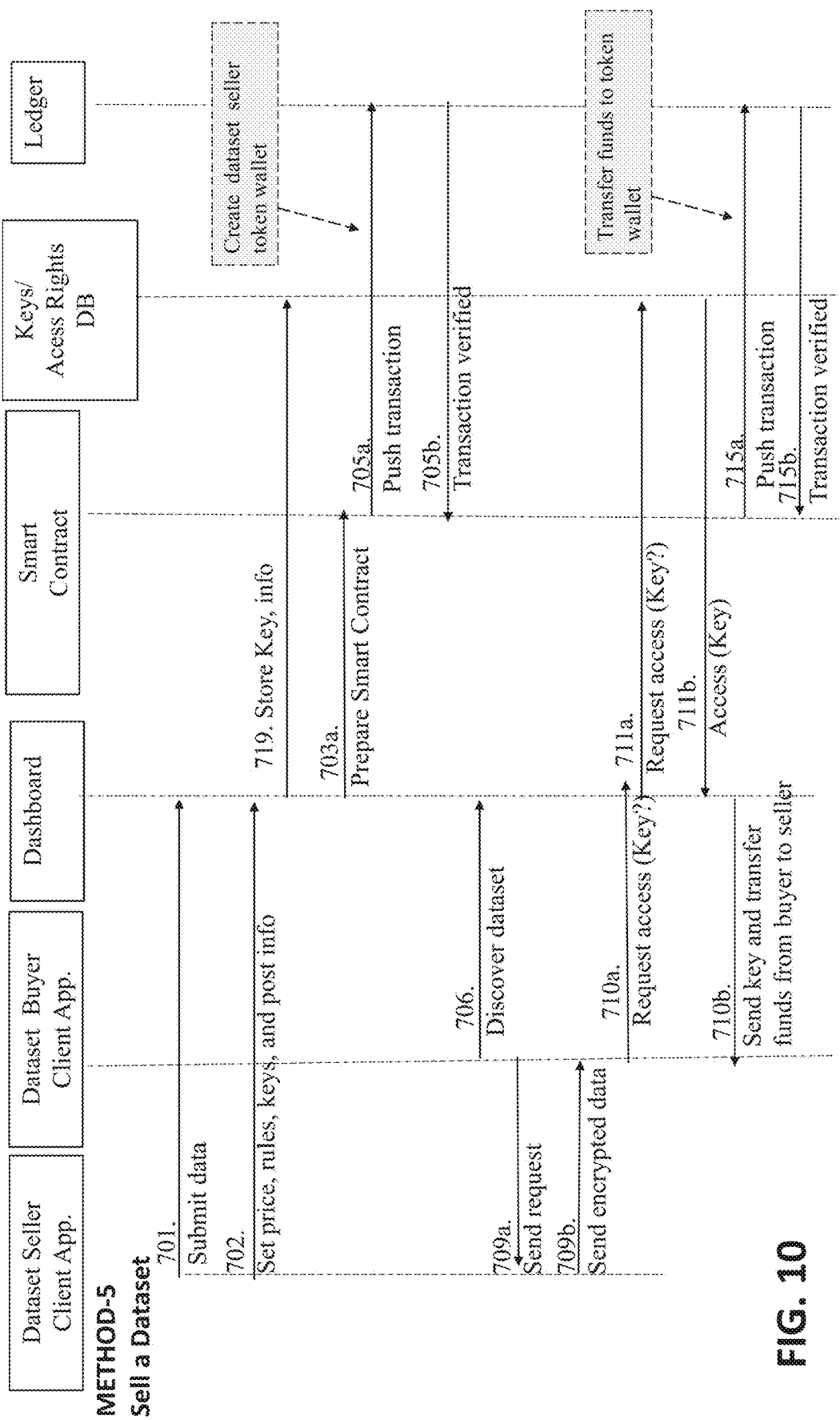
FIG. 10 illustrates a message diagram showing a fifth method of the present invention.

FIG. 10 illustrates the fifth method of the invention, namely the process of selling a dataset. The process starts at steps 701 and 702 at which the information on the dataset including the price, access rights, and privacy requirements are sent to the dashboard. In step 719, the information is stored in the database. The commercial smart contract is prepared in step 703a. In steps 705a and 705b, the smart contract is written on the ledger. In step 706, the buyer discovers the dataset on the dashboard and sends a request to the seller in step 709a to purchase. The seller sends the encrypted data to a qualified buyer in step 709b. In steps 710a, 710b, 711a, and 711b, the buyer receives the decryption key from the system. Meanwhile in steps 715a and 715b, the transaction is recorded on the ledger including the funds transfer.

Figure 11:
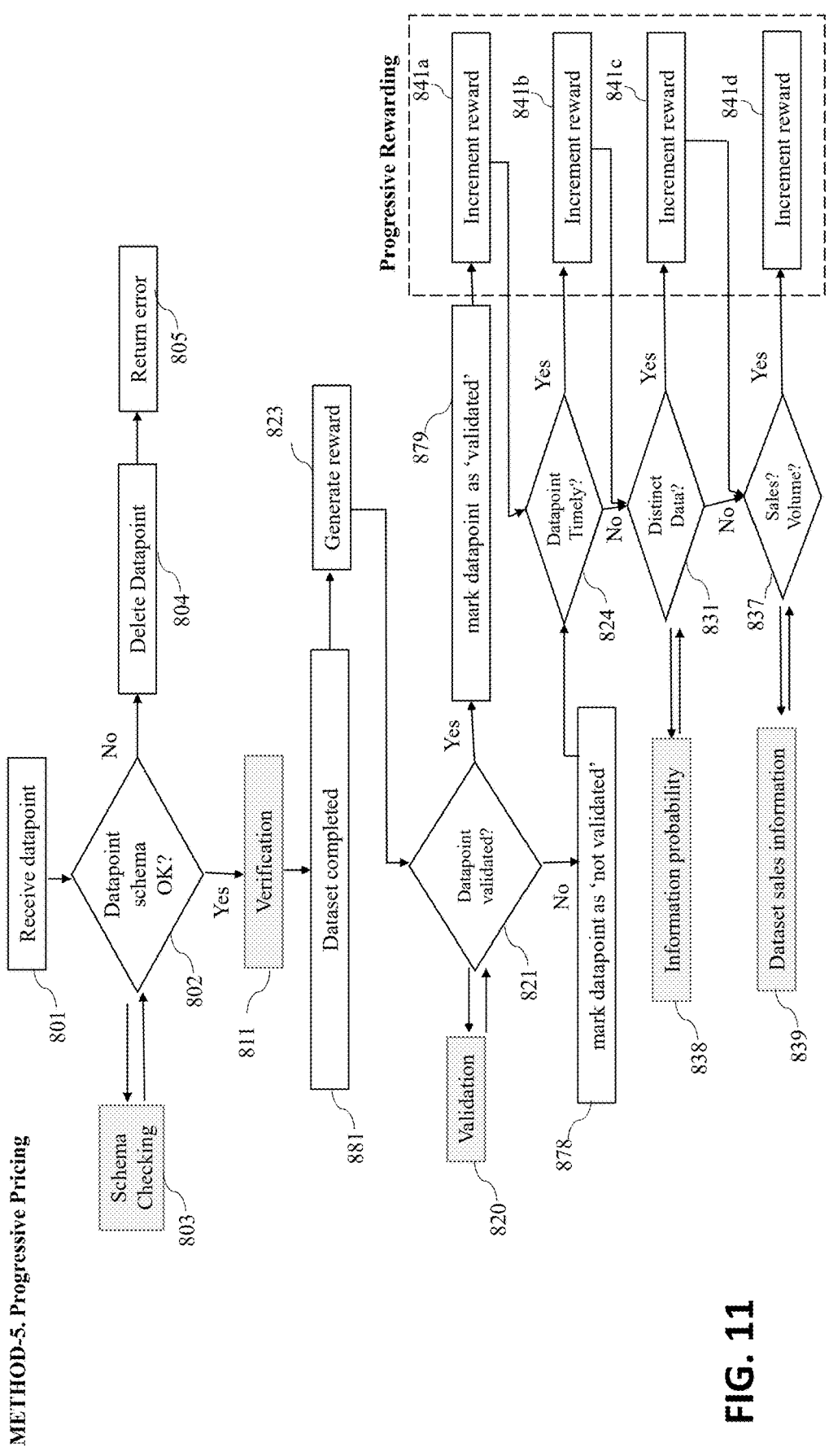
FIG. 11 depicts a flowchart for reward generation according to the present invention.

FIG. 11 illustrates the steps of the method of dynamic and progressive rewarding of datapoint generators. When a datapoint is received in step 801, the data pool manager first checks the conformance to schema in step 802. The schema checker 803 compares the received datapoint's schema with the specified schema. For example, if the datapoint contains an address, it checks if proper address fields are provided. If the datapoint doesn't match the schema, in step 804, it is deleted and an error message is returned to the datapoint generator's client application in step 805. As a result, no rewards are issued. Otherwise, in step 811, the datapoint is sent to verification engine 318 (shown in FIG. 5). The dataset is completed in step 881 by collecting all verified datapoints according to prior steps. Thereafter, each verified datapoint generator receives the first increment of reward in step 823. Next, the validity checkpoint in step 821 is performed by validation engine 328 (shown in FIG. 5) and executed in step 820. If the datapoint is not validated, it is marked as 'not validated' in step 878. Otherwise, it is marked as 'validated' in step 879. If the datapoint is validated by a plurality of datapoints received subsequently, the number of times it is validated may also be marked. The second increment of reward for valid datapoints is issued in step 841a. Thereafter, other checkpoints yield additional incremental rewards. For example, in step 824, a check is performed for the timeliness of data, i.e., how close the timing of data entry is to the specified time. Additional incremental reward 841b is determined accordingly. Thereafter, the entropy (distinctness and importance) of the data is checked in step 831 using the information probability calculation in step 838. Less diffused datapoints receive additional incremental reward 841c. Once the dataset is completed, the sales activities may further trigger additional increments of rewards. For example, in step 837, an incremental reward 841d is issued based on sales volume or a sale that yields a big return provided in step 839. Of course, other checkpoints can be used to trigger rewards depending on implementation. Note that the rewards are called 'incremental' as they appear at the different stages of the process, i.e., during receiving and verifying the datapoint, after validating the datapoint against other received datapoints, after completing the dataset, after sales, etc. The example flow of FIG. 11 is only intended to explain the dynamic (incremental) and progressive rewarding concept according to the invention. The steps used in the scheme may be ordered differently or other checkpoints may be added or deleted depending on implementation. All these variations are obvious modifications and are covered by this invention.

The actual value of a datapoint depends on several factors:
Temporality (received at the right time frame?)
Locality (at the right place?)
Granularity (contains all elements?)
Entropy/Diffusion (distinct?)
Usability (schema-compliant? accurate?)
Validity (validated by other datapoints?)

In general, the more granular, temporal, and usable, the higher the value of the information. Let's assume that a dataset is collecting postal addresses as datapoints in a particular geography. That datapoint and dataset have a particular value. The information on what time a person will be at a particular address as a datapoint has yet another value. But, for last-mile delivery service as the dataset buyer, the latter information has much more importance and hence monetary value. Thus, the value of a specific dataset and hence each datapoint must go up due to its value to a new buyer. The reward must incrementally reflect this added value. Similarly, say if another dataset appears through which a particular datapoint's information is validated, then the value of that datapoint must go up. Therefore, a dynamic and progressive reward strategy is highly useful and provides a fair incentive.

The timeliness, accuracy, and information content of each datapoint are important. For example, if the data pool contains highly temporal data, the urgency of getting the datapoints becomes a dominating factor in rewarding. A time tracker can be included in the smart contract associated with the dataset to represent the value of the temporal aspect of the data and its value. The reward p, of the datapoint can then be determined by a factor that is inversely proportional to the time of data receipt:

$$p = p0/f(Tp-To))$$

where $f(\cdot)$ is an increasing function, To is the time of the dataset creation/curation (or time of submission by the data producer), Tp is the time of the datapoint entry, and p0 is the nominal price. The nearer the purchase time to the curation time, the higher the reward.

High-volume sales may trigger additional incremental rewards. A linear factor can be incorporated into the reward proportional to the number of times the dataset has been sold. Note that blockchain keeps track of the number of sales in the dataset.

$$p = p0(1+g(n))$$

where $g(\cdot)$ is an increasing function, n is the number of sales of the same dataset over a time period; p0 is the original reward at zero sales and p is the price/reward at n sales. Alternatively, the reward can be adjusted by discrete volume of sales (e.g., the reward goes up after every 100 sales by 5%). Additionally, a reward may kick in for highly-priced sales.

The number of datapoints providing the same information must be incorporated into the reward to reflect our trust in the correctness of the data. The second supplier's datapoint is used to validate the first supplier's datapoint, and so on. The first supplier's datapoint can be validated later by the arrival of the second supplier's datapoint, at which time it gets a 'validated stamp'. Data with that stamp can now be priced higher. The number of times the data is validated can also be factored in.

$$p=p0(1+h(v))$$

where v is the number of times the data is validated and $h(\cdot)$ is an increasing function.

Note that these formulas are simple examples just to illustrate how to increment the reward based on new information content. The aforementioned factors can be combined into incremental reward, $\Delta p1$, $\Delta p2$, $\Delta p3$, ... as follows:

$$\Delta p1=p0/f(Tp-To));\ timely$$

$$\Delta p2=p0(1+h(v));\ validated$$

$$\Delta p3=p0(1+g(n))\ldots;\ usable\ and\ important\ldots$$

Other formulas can be implemented, or other factors can be included in the formulas.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer readable storage media for carrying or having computer executable instructions or data structures stored thereon. Such non-transitory computer readable storage media can be any available media that can be accessed by a general-purpose or special-purpose computer, including the functional design of any special-purpose processor. By way of example, and not limitation, such non-transitory computer readable media can include flash memory, RAM, ROM, EEPROM, CD-ROM or other optical disk storage, magnetic disk storage or other magnetic storage devices, or any other medium which can be used to carry or store desired program code means in the form of computer executable instructions, data structures, or processor chip design. The computer readable media does not include carrier waves and electronic signals passing wirelessly or over wired connections.

Computer executable instructions include, for example, instructions and data which cause a general-purpose computer, special purpose computer, or special purpose processing device to perform a certain function or group of functions. Computer executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special-purpose computing devices and storage devices can be interconnected through communication networks.

Some implementations include electronic components, for example, microprocessors, storage, and memory that store computer program instructions in a machine-readable or computer readable medium (alternatively referred to as computer readable storage media, machine-readable media, or machine-readable storage media). Some examples of such computer readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid-state hard drives, read-only and recordable Blu-Ray® discs, ultra density optical discs, any other optical or magnetic media, and floppy disks. The computer readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessors or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but are to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As noted above, particular embodiments of the subject matter have been described, but other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

CONCLUSION

A system and method have been shown in the above embodiments for the effective implementation of a system and method for a fair marketplace for time-sensitive and location-based data. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:

1. A method of creating, by a dataset curator, a temporal and/or location-based dataset in a blockchain-based data marketplace system, the dataset comprising a plurality of datapoints, each datapoint within the plurality of datapoints received from a datapoint generator using data pooling or crowdsourcing, the method comprising the steps of:
   (a) registering, by the dataset curator in the blockchain-based data marketplace system, the dataset comprising a data pool;
   (b) generating, by one or more processors, properties of a requested data pool on a user interface (UI) associated with the dataset curator to solicit the plurality of datapoints, the UI configured to specify at least the following information: a purpose and information content of each datapoint within the plurality of datapoints, a schema of the each datapoint within the plurality of datapoints, and a rewarding method associated with each datapoint within the plurality of datapoints;
   (c) configuring, by the one or more processors, a reward calculator according to the rewarding method in (b) and configuring one or more smart contracts for each datapoint within the plurality of datapoints according to the information specified via the UI in (b);
   (d) generating, by the blockchain-based data marketplace system comprising of at least one processor, a token wallet comprising fungible tokens and a data wallet comprising non-fungible tokens, the token wallet and data wallet both associated with the dataset curator;
   (e) making information associated with the data pool having the plurality of datapoints accessible, by the one or more processors, on the public Internet to receive information regarding additional datapoints to be added to the dataset and transfer out information regarding existing datapoints in the dataset;
   (f) transferring, by the one or more processors, a given datapoint, using the data wallet, via a non-fungible token that includes information associated with the given datapoint, and transferring a fungible token to the datapoint generator providing the datapoint as a cumulative reward,
   wherein the cumulative reward is sequentially increased through the following steps, performed by the one or more processors, each step automatically executed by a smart contract recorded in a distributed blockchain ledger and triggered by verification or validation events determined by a verification engine or validation engine:
     i. accumulating a first reward increment when the datapoint generator submits the datapoint conforming to a predefined dataset schema;
     ii. accumulating a second reward increment upon validation of the datapoint using another datapoint or dataset;
     iii. accumulating a third reward increment upon determining a degree of diffusion of the given datapoint, based on a computed probability of appearance within the dataset using an information-theoretic entropy measure;
     iv. accumulating a fourth reward increment after selling the dataset to a first buyer; and
     v. accumulating a fifth reward increment after selling the dataset to at least one other buyer;
   such that each iterative step in the datapoint's progression triggers the next reward increment, and each executed increment cumulatively increases the total reward over time.

2. The method of claim 1, wherein the method further comprises the step of a given datapoint generator joining the temporal and/or location-based dataset in the blockchain-based data marketplace system, the given datapoint generator requesting a right to submit additional datapoint, the method further comprises the steps of registering the given datapoint generator in the system, and generating, by the blockchain-based data marketplace system, another token wallet and another data wallet associated with the given datapoint generator.

3. The method of claim 1, wherein the datapoint generator is any of the following: people, organization, software application, sensor, Internet of Things (IoT), or hardware device.

4. The method of claim 1, wherein a reward associated with the rewarding method is any of the following, or combinations thereof: a point, cryptocurrency, or cash.

5. The method of claim 1, wherein the dataset curator is also a dataset seller.

6. The method of claim 1, wherein the data wallet stores non-fungible tokens comprising information associated with each of the plurality of datapoints in the dataset and the dataset comprising any of, or a combination of, the following: a location where each of the plurality of datapoints in the dataset is physically stored, one or more privacy settings associated with the dataset, and one or more access rights associated with the dataset.

7. An article of manufacture comprising of a non-transitory computer readable storage medium storing computer readable program code and executable by one or more processors performing the steps of:
   (a) generating properties of a requested data pool on a user interface (UI) associated with a dataset curator to solicit a plurality of datapoints, the UI configured to specify at least the following information: a purpose and information content of each datapoint within the plurality of datapoints, a schema of the each datapoint within the plurality of datapoints, and a rewarding method associated with each datapoint within the plurality of datapoints, wherein the dataset curator creates a temporal and/or location-based dataset in a blockchain-based data marketplace system;

(b) configuring a reward calculator according to the rewarding method in (a) and configuring one or more smart contracts for each datapoint within the plurality of datapoints according to the information specified via the UI in (a);

(c) generating, by the blockchain-based data marketplace system, a token wallet comprising fungible tokens and a data wallet comprising non-fungible tokens, the token wallet and the data wallet both associated with the dataset curator;

(d) making information associated with the data pool having the plurality of datapoints accessible on the public Internet to receive information regarding additional datapoints to be added to a dataset and transfer out information regarding existing datapoints in the dataset, wherein the dataset comprises of the data pool and a plurality of datapoints, each datapoint within the plurality of datapoints are received from a datapoint generator using data pooling or crowdsourcing, and wherein the dataset is registered by the dataset curator in the blockchain-based data marketplace system;

(e) transferring a given datapoint, using the data wallet, via a non-fungible token that includes information associated with the given datapoint, and transferring a fungible token to the datapoint generator providing the given datapoint as a cumulative reward, wherein the cumulative reward is sequentially increased through the following steps, each step automatically executed by a smart contract recorded in a distributed blockchain ledger and triggered by verification or validation events determined by a verification engine or a validation engine:
  i. accumulating a first reward increment when the datapoint generator submits the datapoint conforming to a predefined dataset schema;
  ii. accumulating a second reward increment upon validation of the given datapoint using another datapoint or dataset;
  iii. accumulating a third reward increment upon determining a degree of diffusion of the given datapoint, based on a computed probability of appearance within the dataset using an information-theoretic entropy measure;
  iv. accumulating a fourth reward increment after selling the dataset to a first buyer; and
  v. accumulating a fifth reward increment after selling the dataset to at least one other buyer;

such that each iterative step in the given datapoint's progression triggers the next reward increment, and each executed increment cumulatively increases the total reward over time.

8. The article of manufacture of claim 7 wherein the processor further performing the steps of:
  allowing a given datapoint generator to join the temporal and/or location-based dataset in the blockchain-based data marketplace system, the given datapoint generator requesting a right to submit an additional datapoint,
  registering the given datapoint generator in the system, and
  generating another token wallet and another data wallet associated with the given datapoint generator.

9. The article of manufacture of claim 7, wherein the datapoint generator is any of the following: people, organization, software application, sensor, Internet of Things (IoT), or hardware device.

10. The article of manufacture of claim 7, wherein a reward associated with the rewarding method is any of the following, or combinations thereof: a point, cryptocurrency, or cash.

11. The article of manufacture of claim 7, wherein the dataset curator is also a dataset seller.

12. The article of manufacture of claim 7, wherein the data wallet stores non-fungible tokens comprising information associated with each of the plurality of datapoints in the dataset and the dataset comprising any of, or a combination of, the following: a location where each of the plurality of datapoints in the dataset is physically stored, one or more privacy settings associated with the dataset, and one or more access rights associated with the dataset.

* * * * *